US011220184B2

(12) United States Patent
Reber et al.

(10) Patent No.: US 11,220,184 B2
(45) Date of Patent: Jan. 11, 2022

(54) CONTROLLING THE TEMPERATURE OF A CHARGING CABLE FOR A FAST CHARGING STATION FOR VEHICLES WITH AN ELECTRIC DRIVE

(71) Applicant: Dr. Ing. h.c. F. Porsche Aktiengesellschaft, Stuttgart (DE)

(72) Inventors: Volker Reber, Michelbach an der Bilz (DE); Stefan Götz, Forstern (DE); Jari Rönfanz, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 500 days.

(21) Appl. No.: 16/217,565

(22) Filed: Dec. 12, 2018

(65) Prior Publication Data
US 2019/0217707 A1 Jul. 18, 2019

(30) Foreign Application Priority Data

Jan. 15, 2018 (DE) .......................... 102018100731.0

(51) Int. Cl.
*B60L 5/02* (2006.01)
*B60L 1/04* (2006.01)
(Continued)

(52) U.S. Cl.
CPC .................. *B60L 5/02* (2013.01); *B60L 1/02* (2013.01); *B60L 1/04* (2013.01); *B60L 53/18* (2019.02);
(Continued)

(58) Field of Classification Search
CPC ...... B60L 5/02; B60L 1/04; B60L 1/02; B60L 11/1816; B60L 11/1818; B60L 11/1825; B60L 3/0069; B60L 3/04; B60L 2230/12; B60L 2240/36; B60L 2240/662; B60L 2240/80; B60L 2250/12; B60L 53/18; B60R 16/033; H01B 7/42; H05B 3/12; Y02T 90/12; Y02T 90/14; Y02T 90/16; Y02T 90/121; Y02T 90/128;
(Continued)

(56) References Cited

U.S. PATENT DOCUMENTS 9,321,364 B1  4/2016 Ashworth et al.
9,511,673 B2 * 12/2016 Rill .......................... B60L 53/16
(Continued)

FOREIGN PATENT DOCUMENTS

DE    202011050446 U1   9/2011
DE    102011119495 A1   5/2013
(Continued)

*Primary Examiner* — Shawntina T Fuqua
(74) *Attorney, Agent, or Firm* — RatnerPrestia

(57) ABSTRACT

A method for controlling the temperature of a changing cable of a fast charging station for fast charging a battery of a vehicle with an electric drive. The method includes the steps of heating the charging cable in order to form an electrical connection of the charging cable to the vehicle, sensing connection of the charging cable to the vehicle, and ending the heating of the charging cable for fast charging the battery of the vehicle. A fast charging station has a charging cable for fast charging a battery of a vehicle with an electric drive. The fast charging station is designed to carry out the above method for controlling the temperature of a charging cable.

16 Claims, 4 Drawing Sheets

(51) Int. Cl.
*B60L 53/18* (2019.01)
*B60L 1/02* (2006.01)
*B60R 16/033* (2006.01)
*H01B 7/42* (2006.01)
*H05B 3/12* (2006.01)

(52) U.S. Cl.
CPC ............ *B60R 16/033* (2013.01); *H01B 7/42* (2013.01); *H05B 3/12* (2013.01)

(58) Field of Classification Search
CPC . Y02T 10/7072; Y02T 10/70; Y02T 10/7005; Y02T 10/7088; Y02T 10/7291; H02J 7/00; H01R 13/6608; H01R 13/701
See application file for complete search history.

(56) References Cited

U.S. PATENT DOCUMENTS

| | | | |
|---|---|---|---|
| 10,081,262 | B2 | 9/2018 | Nagel et al. |
| 2011/0199047 | A1* | 8/2011 | Fujii .................. B60L 53/16 320/109 |
| 2015/0115889 | A1 | 4/2015 | Rill et al. |

FOREIGN PATENT DOCUMENTS

| | | |
|---|---|---|
| DE | 102012208005 A1 | 11/2013 |
| DE | 102015112347 A1 | 2/2017 |
| JP | H10108376 A | 4/1998 |
| JP | 2010193618 A | 9/2010 |

\* cited by examiner

CONTROLLING THE TEMPERATURE OF A CHARGING CABLE FOR A FAST CHARGING STATION FOR VEHICLES WITH AN ELECTRIC DRIVE

CROSS-REFERENCE TO RELATED APPLICATION

This application claims priority to German Patent Application No. DE 10 2018 100 731.0, filed Jan. 15, 2018, which is incorporated by reference herein in its entirety.

FIELD OF THE INVENTION

The present invention relates to a method for controlling the temperature of a charging cable of a fast charging station for fast charging a battery of a vehicle with an electric drive.

Furthermore, the invention relates to a fast charging station having a charging cable for fast charging a battery of a vehicle with an electric drive.

BACKGROUND OF THE INVENTION

Vehicles with an electric drive usually comprise a drive battery which makes available electrical energy for driving the vehicle. The vehicle can be an exclusively electrically operated vehicle or what is referred to as a hybrid vehicle which, in addition to the electric drive, additionally has a further, conventional drive, typically an internal combustion engine. The drive battery is also referred to herein simply as a battery.

The drive battery usually comprises in this context a multiplicity of battery cells which are connected in series and in parallel with one another, in order to make available a suitable combination of current and voltage for the electric drive.

However, the acceptance of electrically driven vehicles is currently still low, since it takes a long time to charge the drive battery. In this context, various strategies for charging the drive battery are known.

For charging at a conventional AC voltage or three-phase socket, a vehicle typically has an on-board charging device which both carries out a required conversion from alternating current to direct current and controls the charging operation. The charging pillar therefore passive in this case.

However, this AC charging mode is limited owing to the available input power, which is generally limited in its power by a supply voltage of 230V or 400V and a supply current of at maximum 16 A or 32 A. As a result, the charge rate when charging in the AC charging mode is limited and in contemporary electric vehicles there can be resulting charging times of several hours per 100 km range.

On account of the long charging times for AC charging, DC charging with DC voltage has been developed. In contrast to AC charging, the vehicle here does not have a separate charging device for setting and maintaining charging parameters, i.e in particular charging current and charging voltage. Instead, the vehicle-external charging station carries out the charging process and also shapes the voltage and current as is necessary and/or desired for charging the drive battery of the connected vehicle. The corresponding charging station is then responsible for maintaining charging parameters.

In the case of DC charging, a charging cable usually comprises two DC charging lines which are typically connected directly to the poles of the drive battery of the vehicle during the charging process. There is generally no DC isolation between the DC charging lines and the drive battery. The power levels of such DC charging stations are currently up to 50 kW. This is a multiple of the computationally possible 12.8 kVA, such as can be theoretically achieved in the AC charging mode when charging with 400V three-phase current at 32 A. DC charging therefore already permits significantly accelerated charging of the drive battery compared to AC charging.

Currently available vehicles have a drive battery with an overall capacity of often 30-60 kWh, and in some cases up to 100 kWh. Therefore, even with the currently available DC charging technology, computational charging times for complete charging of the drive battery turn out to be at least one to two hours. Owing to practical limitations when charging the drive battery, the charging times can be even longer in practice. For example, before complete charging is achieved, current batteries are often no longer charged with the maximum charging current in order to increase the service life of the battery and avoid damage.

At present, improved DC fast charging stations are being developed which have, for example, a maximum power of up to 300 kW in order to achieve or even exceed charge rates of more than 20 km/min. This power can be achieved by using, for example, charging voltages of up to 1000 V in order to appropriately limit necessary charging currents, in this case to 300 A, for example. Therefore, the re-charging of the drive battery, for example when travelling, can be changed to orders of magnitude which customers are used to from refueling their previous vehicles with internal combustion engines. Exemplary details regarding DC charging and the corresponding processes in the charging system and in the vehicle are described in DIN EN 61851, which is incorporated by reference herein, for example.

Corresponding fast charging stations therefore require high charging currents, requiring correspondingly large copper cross sections of the DC charging lines in the charging cable. In addition, owing to the weather, effects of light and the high DC voltage used, a correspondingly thick and robust cable sheath as well as sufficiently thick insulation are necessary in the interior of the charging cables. In total, the diameters of typical charging cables already often exceed 30 mm nowadays, with even larger cable cross sections expected in the future. This makes the charging cables significantly more difficult to handle, owing to the actual weight of the conductor, which is typically fabricated from copper or aluminum, as well as the weight of the insulation and of the cable sheath. The materials which are used for the conductor and the insulation, which are usually fabricated from plastics such as, for example, polyurethane, also have a high degree of rigidity. The high degree of rigidity reinforces the effect of the large weight of the cable in that the charging cable and therefore the charging plug are very difficult to move and, in particular, very difficult to rotate. Moreover, the weight of the cable is often not directed perpendicularly with respect to the ground but rather a large lever effect can arise as a result of the high degree of rigidity of the charging cable. Therefore, it can be difficult to move the charging cable with the charging plug from the fast charging station to the vehicle which is to be charged, to orient the charging plug accurately with a charging socket of the vehicle and finally to connect the charging plug to the charging socket. In this context, rapid fatigue or exhaustion can occur, which can adversely affect the acceptance of electric vehicles.

Although highly flexible charging cables with finely filamented copper lines and soft insulation materials and sheath materials are known, made, for example, from soft PVC (PVC-P) or preferably from silicone-based materials. These materials are, however, expensive and generally very susceptible to mechanical damage and environmental influences.

In this context, US 2015/0115889 A1, which is incorporated by reference herein, discloses an electric connecting arrangement for a charging system, in particular for charging a vehicle battery of a motor vehicle. The connecting arrangement comprises a first connecting element which can be connected to a charging station and which can enter into electrical charging contact with a second connecting element which is mounted on a mobile platform. In this context, at least one heating element is integrated into the first connecting element and/or into the second connecting element.

Moreover, DE 10 2011 119 495 A1, which is incorporated by reference herein, discloses a charging cable for charging a motor vehicle-side energy storage unit for electrical energy. The charging cable comprises at least one connecting element for connecting to a motor-vehicle-side connection of the energy storage unit or to a connection at an external energy source which is designed to make available electrical energy, wherein an electric heating device is provided for heating the connecting element and at least one section of the charging cable.

Furthermore, US 2011/0199047 A1, which is incorporated by reference herein, discloses a charging device and a charging system. The charging device contains a charging cable and a charging plug. A heater is configured in such way that it heats the charging plug with electrical current which is made available by the charging cable. A state-determining device is designed to ascertain a state of charge of a battery mounted in the vehicle and to determine whether a heating condition for heating the charging plug is satisfied. A heating controller is configured to control heating by the heater on the basis of a determination by the state-determining device. The heater is able to be switched to a post-charging heating state in which the heating device heats the charging plug after the ending of the charging of the battery mounted in the vehicle. The heating controller switches the heater into the post-charging-heating state and controls the heating which is carried out by the heater if the state-determining device determines that the charging process of the battery which is mounted on the vehicle is ended, and furthermore determines that a heating condition is satisfied.

Document U.S. Pat. No. 9,321,364 B1, which is incorporated by reference herein, also discloses an electric bus which can have a charging interface which is positioned on an external surface of the electric bus. One or more heating cushions can be mounted in a removable fashion on the charging interface and configured to heat the charging interface. The heating cushions can comprise a rigid plate which forms an exposed surface of the charging interface. The plate can be positioned such that a first side of the plate forms a charging head contact face when the charging head engages with the charging interface. A heating device can be mounted on a second side of the plate opposite the first side. The heating device can comprise a heating element which is configured to heat the plate by resistance heating.

SUMMARY OF THE INVENTION

Taking the above-mentioned prior art as starting point, described herein is a method and a fast charging station of the type specified above, which permits simple handling of a charging cable for charging the vehicle.

According to aspects of the invention, a method is thus provided for controlling the temperature of a charging cable of a fast charging station for fast charging a battery of a vehicle with an electric drive, comprising the steps of heating the charging cable in order to form an electrical connection of the charging cable to the vehicle, sensing connection of the charging cable to the vehicle, and ending the heating of the charging cable for fast charging the battery of the vehicle.

Disclosed herein is a fast charging station having a charging cable for fast charging a battery of a vehicle with an electric drive, wherein the fast charging station is designed to carry out the above method for controlling the temperature of a charging cable.

Also disclosed herein is a way to improve the handling of the charging cable by virtue of the fact that the charging cable is heated before use. The heating reduces the rigidity of a conductor material, which is usually copper or aluminum, as well as that of an insulation layer of the conductors of the charging cable and of the charging cable sheath. As a result, a flexibility of the charging cable can be improved overall in order to improve its handling at the start of the charging process, i.e. before or during the removal of the charging cable from a holder in the charging station, in order to permit a pleasant plugging in process for the user. In this context, the property, in particular of plastics which are typical for charging cable sheaths, for example polypropylene, polyvinyl chloride, polyurethane, polyamide or tetrafluoroethylene/Teflon and also of copper cables, that they become more flexible as the temperature increases and have a relatively low rigidity, is used. However, the rigidity of typical materials for the charging lines of the charging cable is also reduced. This goes significantly beyond methods which are known in the prior art and in which the charging plug and/or the corresponding charging socket are heated in order to prevent the charging plug from becoming frozen fast in the charging socket.

The heating of the charging cable improves its handling, in particular at low external temperatures to which the charging cables are often subjected. This applies all the more so if the fast charging stations are installed at locations with low ambient temperatures which are, for example, below a worldwide or regional mean value.

A use of the charging cable can the detected, for example, by means of a contact or some other detection in the holder of the charging cable in the fast charging station, that is to say by removal of the charging cable from its holder. Heating can therefore be started. Alternatively, when not in use, the charging cable can be heated continuously, or heating can be started according to other criteria.

The heating of the charging cable is preferably already started at such an early time that the charging cable can heat sufficiently, with the result that its rigidity is sufficiently reduced for use. This applies, in particular, to the charging cable sheath. Owing to thermal properties of the charging cable, in particular the transmission of heat in the charging cable, heating the charging cable takes place with a delay. For example, the heating of the charging cable is already started before the charging cable is removed from its holder. The charging cable therefore has its desired reduced rigidity when in use.

The charging cable can be heated in different ways here. For example, a heating coil can be used, which is integrated in the holder of the charging cable in the charging pillar. This heating coil transmits heat to the conductor material of the charging plug and via the latter to the charging cable with the charging lines. The conductor material is usually a metal which is a good electrical conductor, for example copper or aluminum. These conductive materials also have, as metals, a good thermal conductivity, with the result that the charging lines are heated first, i.e. the heat is distributed along the charging cable. The charging cable sheath with the insulation layer is also heated by the heated charging lines. Moreover, a coolant circuit, as is already used in the prior art for cooling the charging lines of the charging cable during the charging process, can be modified in such a way that the charging cable is heated, for example, by a heat-generating component. A heater, a heat pump or a heat exchanger can be used for heating before the charging process. Furthermore, the charging cable can have an electric heating device which extends through it.

It is particularly advantageous here that the heating of the charging cable for fast charging the battery of the vehicle is ended as quickly as possible after the cable connection between the charging station and the vehicle has been formed. Owing to large currents which occur during the fast charging, the charging cable is heated, with the result that further heating is not necessary. Moreover, excessive heating of the charging cable can even be disadvantageous, since the electrical resistance of the charging cable, i.e. the electrical resistance of the conductor material, usually rises with the temperature, with the result that the electrical losses increase with the temperature.

Correspondingly, the sensing of the connection of the charging cable to the vehicle is important. Details on this sensing are given below. The charging cable is connected here by means of its charging plug to a corresponding charging socket of the vehicle. Various standards are known for the charging plug and the charging socket, for example CHAdeMO, Combined Charging System (CCS) Combo Type 2, Mennekes plug and the like.

The fast charging station can in principle be embodied with an AC charging mode in which a supply voltage of 230 V or 400 V and a supply current of at maximum 16 A or 32 A can be used. The fast charging station is preferably embodied with a DC charging mode for DC charging with DC voltage. The fast charging station preferably has a power level of up to 50 kW, particularly preferably of up to 300 kW. For this purpose, a charging voltage of, for example, 1000 V and a charging current of, for example, 300 A can be set. Details on DC charging and corresponding processes in the fast charging station and in the vehicle are described in DIN EN 61851, for example.

The charging cable comprises at least two charging lines and a charging cable sheath as well as a sufficiently thick insulation of the at least two charging lines in the interior of the charging cable. The charging lines are manufactured, for example, from copper or aluminum, and the installation of the charging lines from polyurethane, for example. The charging cable sheath is manufactured from plastic, for example polypropylene, polyvinyl chloride, polyurethane, polyamide or tetrachloroethylene/Teflon.

In order to limit the heating of the charging cable during the charging process, there can be additionally provision that the fast charging station cools the charging cable during the charging process. Corresponding cooling devices and cooling methods are known per se in the prior art.

The vehicle with an electric drive can be an exclusively electrically operated vehicle or a so-called hybrid vehicle which, in addition to the electric drive, additionally has a further, conventional drive, typically an internal combustion engine. The vehicle comprises a drive battery which is denoted below merely as a battery for the sake of simplicity. The battery typically comprises a multiplicity of battery cells which are connected in series and in parallel with one another, in order to make available a suitable combination of current and voltage for the electric drive.

In one advantageous refinement of the invention, the method comprises an additional step for pre-heating the charging cable. Therefore, for example the charging cable can be pre-heated to a temperature which ensures that the charging cable can be heated in good time for subsequent connection to a vehicle to be charged, in order to reduce the rigidity to a desired extent which facilitates the handling of the charging cable. Alternatively, when not in use the charging cable can be pre-heated continuously with a low constant power level. In this context, in principle different settings can be applied for the pre-heating, for example continuous pre-heating with a low power level as a basic state, and preparatory pre-heating if use of the charging cable is already expected but has not yet been confirmed. The pre-heating can occur as a function of the temperature, for example as a function of an ambient temperature or of a temperature of the charging cable, for example of a temperature of the charging lines of the charging cable.

In one advantageous refinement of the invention the method comprises an additional step for sensing imminent connection of the charging cable to the vehicle, and the step of heating the charging cable in order to form an electrical connection with the vehicle takes place after the sensing of imminent connection of the charging cable to the vehicle. The sensing of the imminent connection of the charging cable to the vehicle is helpful in order to be able to start the heating of the charging cable already at such an early time that when a user uses the charging cable, starting, for example, by removing the charging cable from its holder, an easy-to-handle charging cable is always available, so that said user can easily connect it to his vehicle. Depending on the charging cable, in particular on the types of material and material thicknesses used, heating of the charging cable takes a specific time in order to reach a desired flexibility of the charging cable. In order to keep the heating power low, it is necessary here to be able to carry out the heating of the charging cable over a sufficient time. Therefore, the imminent use of the charging cable must be detected as early as possible. The imminent connection of the charging cable to the vehicle can be sensed, for example, by interaction of the driver with the fast charging station, for example by identification or authentication of the driver at the fast charging station. This can be done, for example, with a payment card or identification card, for example credit card, by inserting the card or in a wireless fashion, for example by means of RFID. Such interaction can already take the form of a first activation of a user interface of the fast charging station, for example by pressing or touching a screen or operator control buttons. Repeated activation of the user interface, i.e. repeated pressing or touching, preferably not randomly but rather in an expected sequence within a specific time, is preferably used to detect that a connection of the charging cable to the vehicle is imminent. The same also applies to communication of the vehicle with the fast charging station before the connection to the charging cable is formed. The communication can either take place automatically with the fast charging station by means of the vehicle or by the driver of the vehicle via a user interface of the vehicle.

In one advantageous refinement of the invention, the step of sensing imminent connection of the charging cable to the vehicle comprises sensing the approaching of a vehicle to the fast charging station. The approaching of the vehicle can take place, for example, with an induction loop which is integrated into a parking space which is assigned to the fast charging station. Alternatively, for example camera-based methods can be used in order to sense approaching of the vehicle to the fast charging station. The vehicle can also already transmit a message about an imminent approach to the fast charging station on the basis of route planning and/or a state of charge of the battery.

In one advantageous refinement of the invention, the step of sensing connection of the charging cable to the vehicle comprises evaluating an electrical signal between the charging station and the vehicle via the charging cable. In principle, various electrical signals can be evaluated here. This can be a signal which is generated when the charging plug of the charging cable is connected to the vehicle, for example by the opening or closing of an electrical contact. Alternatively or additionally, a communication signal of the vehicle with the fast charging station can be evaluated as an electrical signal, for example in the case of a so-called "handshake" between the vehicle and the fast charging station. In the charging standard IEC 61851, which is widespread in Europe and North America, the control pilot signal or the proximity pilot signal of said standard has proven suitable. For the CHaDeMo standard, which is widespread in Asia, for example the proximity detection signal of said standard can be used. A plugged state of the charging plug in the corresponding charging socket of the vehicle can be respectively identified by means of these signals, in order to sense connection of the charging cable to the vehicle and end the heating of the charging cable.

In one advantageous refinement of the invention, the step of sensing connection of the charging cable to the vehicle comprises sensing an expiry of a connection timer. Such a connection time can cover, for example, a typical duration of the plugging process. Correspondingly, after the expiry of the connection timer, the heating of the charging cable is stopped. The connection timer can be started, for example, after the conclusion of an identification process of the vehicle or of the driver at the fast charging station or after sensing the approaching of the vehicle to the fast charging station. Such an identification process or approaching is typically followed by the connection of the charging cable to the vehicle.

In one advantageous refinement of the invention, the method comprises additionally steps for sensing imminent disconnection of the charging cable from the vehicle, and for heating the charging cable to bring about disconnection of the charging cable from the vehicle. Particularly in the case of fast charging with high charging currents it can be assumed that the temperature of the charging cable is sufficient at the end of the charging process to reduce the rigidity of the charging cable. Under certain circumstances it may be sufficient to reduce a cooling of the charging cable at the end of the charging process. Even if this is the case, a heating of the charging cable facilitates its handling, at least when the charging cable is not disconnected from the vehicle directly after the ending of the charging process, but rather only after a certain delay. Since a duration of the charging process cannot always be calculated precisely, such a delay can easily occur. For example, a duration of a break in a journey may also be longer than a fast charging process which is carried out in parallel. In principle, the same statements regarding the handling of the charging cable when the charging cable is connected to the vehicle apply to the disconnection of the charging cable from the vehicle. The imminent disconnection of the charging cable from the vehicle can be sensed in different ways, as is explained in detail below. When the charging process ends, a temperature of the charging cable can be additionally sensed in order to heat the charging cable only when necessary.

In one advantageous refinement of the invention, the step of sensing imminent disconnection of the charging cable from the vehicle comprises sensing an end of the charging process. Particularly in the case of fast charging with high charging currents it can be assumed that the temperature of the charging cable is sufficient at the end of the charging process to reduce the rigidity of the charging cable. However, for example owing to a charging characteristic which is necessary for charging the drive battery, it may be the case that the drive battery is charged with a low current at the end of the charging cable, so that the charging cable is only heated slightly as a result. In particular, this heating can be too low to reduce the rigidity of the charging cable to a desired extent at the end of the charging process. After the end of the charging process, it may in principle occur that at any time the charging cable is disconnected from the vehicle, so that after the end of the charging process the charging cable can be continuously heated or kept warm.

In one advantageous refinement of the invention, the step of sensing imminent disconnection of the charging cable from the vehicle comprises sensing a signal or sensing an activation by a driver of the vehicle. For example, the charging station or the vehicle can send a notification to the driver or the vehicle when the charging process is concluded. For example, imminent disconnection of the charging cable from the vehicle can be sensed by a corresponding confirmation by the driver. Alternatively, approaching of the driver to the vehicle or to the charging station can be detected and used as a signal for the imminent disconnection of the charging cable from the vehicle. Interaction of the driver with the fast charging station can also indicate imminent disconnection of the charging cable from the vehicle, for example conclusion of a payment process or "checking out" at the fast charging station.

Below, aspects of the invention will be explained by way of example with reference to the appended drawings and on the basis of preferred exemplary embodiments, wherein the features presented below may in each case individually or in combination represent an aspect of the invention.

DETAILED DESCRIPTION OF THE INVENTION

Figure 1:
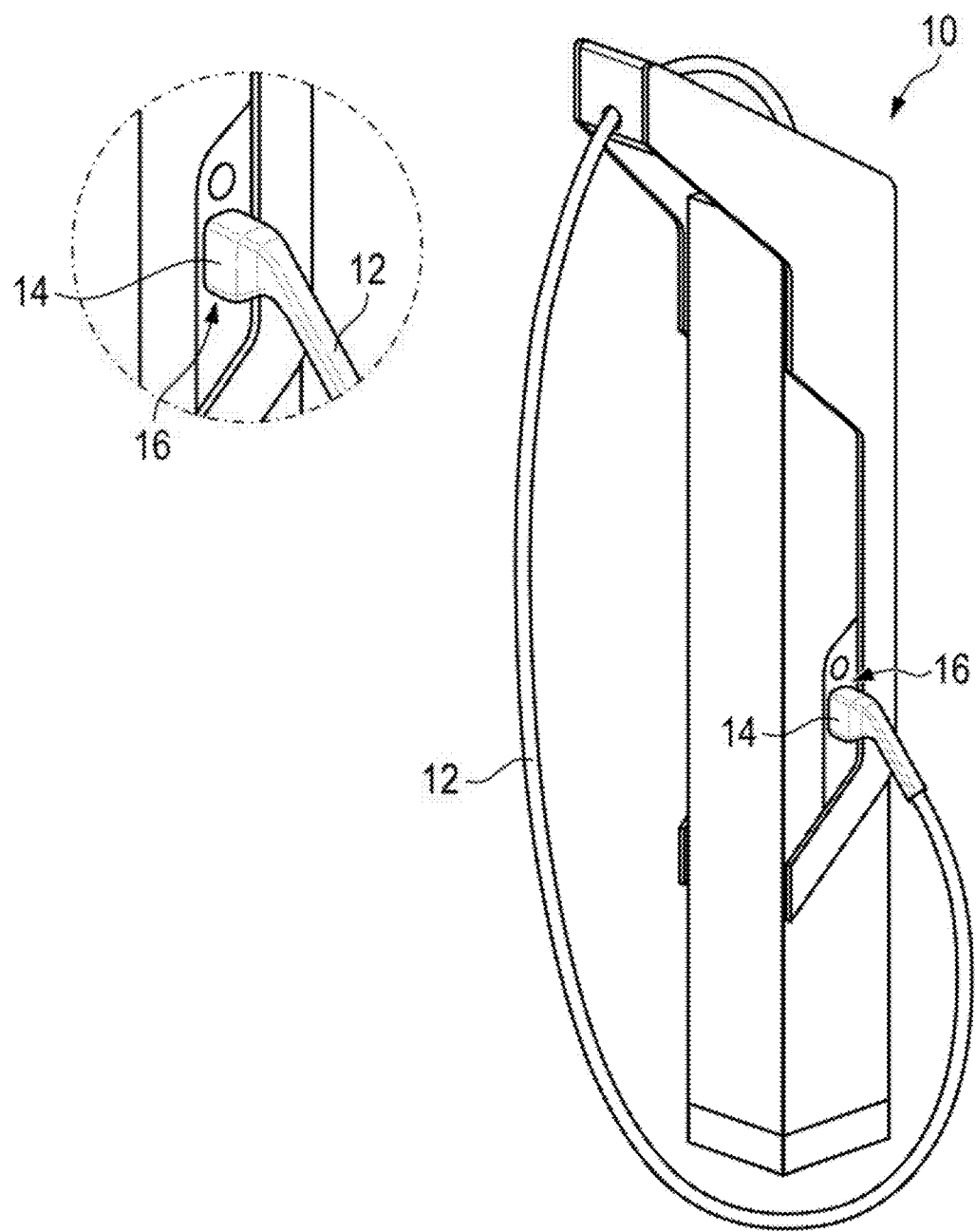
FIG. 1 shows a schematic illustration of a fast charging station for fast charging a battery of a vehicle with an electric drive according to a first, preferred embodiment in a perspective view.

FIG. 1 shows a fast charging station 10 according to aspects of the invention according to a first preferred embodiment.

The fast charging station 10 comprises a charging cable 12 for fast charging a battery of a vehicle (not illustrated here) with an electric drive. The charging cable 12 is embodied at its end remote from the fast charging station 10 with a charging plug 14 according to the Standard Combined Charging System (CTS) Combo type 2. The charging plug 14 is held, when not in use, in a holder 16 of the fast charging station 10.

The fast charging station 10 is preferably embodied with a DC charging mode for DC charging with DC voltage. The fast charging station 10 preferably has a power level of up to 50 kW. In an alternative embodiment, the fast charging station 10 has a power level of up to 300 kW. In order to achieve this, the fast charging station 10 has a charging voltage of up to 1000 V and a charging current of up to 300 A.

Figure 2:
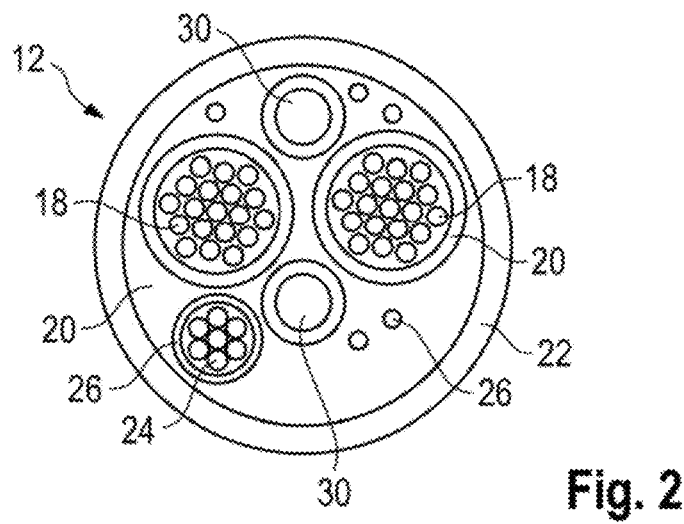
FIG. 2 shows a schematic illustration of a charging cable of the fast charging station from FIG. 1 according to a second embodiment, wherein two fluid ducts are arranged in the sheath of the charging cable, in a sectional view.

A charging cable 12 according to a second embodiment is illustrated in detail in FIG. 2. The charging cable 12 according to the second embodiment can be used with the fast charging station 10 according to the first embodiment.

The charging cable 12 according to the second embodiment comprises two DC charging lines 18 as charging conductors with corresponding insulations 20 which are arranged in a charging cable sheath 22. The DC charging lines 18 are embodied here as DC charging lines 18 for charging with DC current and are manufactured from copper. The installations 20 of the DC charging lines 18 are fabricated from polyurethane. The charging cable sheath 22 is manufactured from polypropylene here.

Furthermore, arranged in the charging cable sheath 22 is a ground conductor 24 which is surrounded by a corresponding ground insulation 26.

Moreover, a multiplicity of signal conductors 28 with which the vehicle can communicate with the fast charging station 10 are arranged in the charging cable sheath 22.

Moreover, two fluid lines 30, in which a fluid can circulate, are formed in the charging cable sheath 22. The two fluid lines 30 are connected to the fast charging station 10 at an end thereof facing said fast charging station 10. At an end of the charging cable 12 facing the charging plug 14, the two fluid lines 30 are connected to one another in order to permit circulation of the fluid from the fast charging station 10 through one of the fluid lines 30 in the direction of the charging plug 14 and through the other fluid line 30 back from the charging plug 14 to the fast charging station 10.

As result of the arrangement of the two fluid lines 30 on two sides of the two DC charging lines 18, the temperature of the two DC charger lines 18 can be efficiently controlled by means of the two fluid lines 30. The fluid in the two fluid lines 30 can contribute to controlling the temperature of the charging cable 12 and, in particular, of the two DC charging lines 18. In particular, as result of this arrangement of the charging cable sheaths 22, temperature control can be carried out in each case from two sides by means of the two fluid lines 30. This results in a large sectional area with the two DC charging lines 18.

Figure 3:
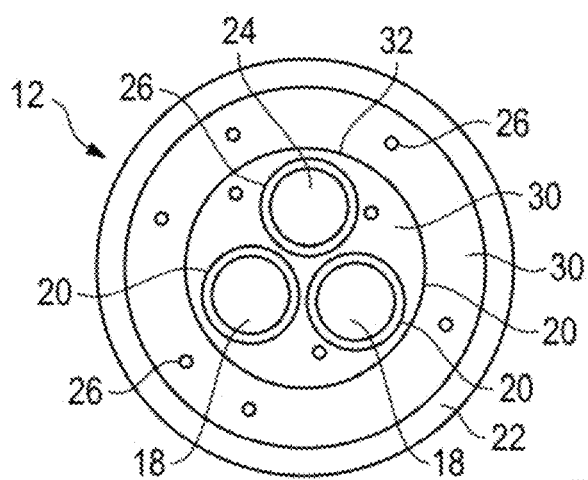
FIG. 3 shows a schematic illustration of a charging cable of the fast charging station from FIG. 1 according to a third embodiment, wherein two fluid ducts are arranged concentrically in the sheath of the charging cable, in a sectional view.

A charging cable 12 according to a third embodiment is illustrated in detail in FIG. 3. The charging cable 12 according to the third embodiment can be used with the fast charging station 10 according to the first embodiment. Moreover, the charging cable 12 according to the third embodiment corresponds partially to the charging cable 12 according to the second embodiment, and therefore essentially differences from the charging cable 12 according to the second embodiment are described below.

The charging cable 12 according to the third embodiment comprises two DC charging lines 18 with corresponding insulations 20 which are arranged in a charging cable sheath 22. The DC charging lines 18 are arranged there together with a grounding conductor 24 which is surrounded by corresponding ground insulation 26.

The charging cable 12 comprises, distributed over the cross-section of the charging cable sheath 22, a multiplicity of signal conductors 28 with which the vehicle can communicate with the fast charging station 10.

Moreover, two fluid lines 30, in which a fluid can circulate, are formed in the charging cable sheath 22. The two fluid lines 30 are arranged concentrically within the charging cable sheath 22 and separated from one another by a separating wall 32. Both the two DC charging lines 18 and the grounding conductor 24 are positioned here in a central region of the charging cable 12, within the same fluid line 30.

Also according to the third embodiment, the two fluid lines 30 are connected to the fast charging station 10 at an end facing said fast charging station 10, and the two fluid lines 30 are connected to one another at an end of the charging cable 12 facing the charging plug 14.

Figure 4:
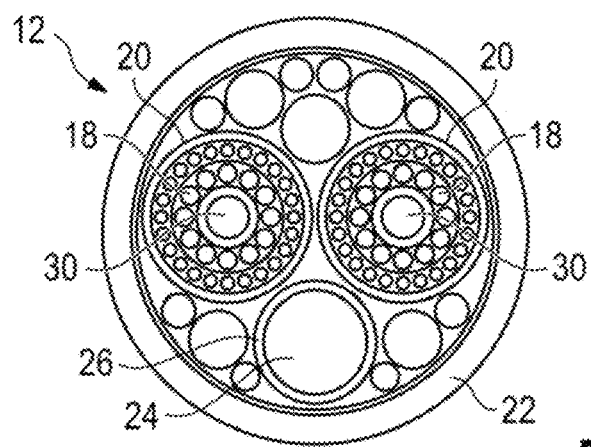
FIG. 4 shows a schematic illustration of a charging cable of the fast charging station from FIG. 1 according to a fourth embodiment, wherein two fluid ducts are arranged in two charging lines of the charging cable, in a sectional view.

A charging cable 12 according to a fourth embodiment is illustrated in detail in FIG. 4. The charging cable 12 according to the fourth embodiment can be used with the fast charging station 10 according to the first embodiment. Moreover, the charging cable 12 according to the fourth embodiment corresponds partially to the charging cable 12 according to the second embodiment, and therefore mainly differences from the charging cable 12 according to the second embodiment are described below.

The charging cable 12 according to the fourth embodiment comprises two DC charging lines 18 with corresponding insulations 20 which are arranged in a charging cable sheath 22. The DC charging lines 18 are arranged there together with a grounding conductor 24 which is surrounded by corresponding ground insulation 26.

The charging cable 12 illustrated in FIG. 4 also comprises a multiplicity of signal conductors 28 with which the vehicle can communicate with the fast charging station 10. However, these signal conductors 28 are not illustrated in FIG. 4.

Moreover, two fluid lines 30, in which a fluid can circulate, are formed in the charging cable sheath 22. The two fluid lines 30 are each formed concentrically within the two DC charging lines 18. Also according to the fourth embodiment, the two fluid lines 30 are connected to the fast charging station 10 at an end facing said fast charging station 10, and the two fluid lines 30 are connected to one another at an end of the charging cable 12 facing the charging plug 14.

In an alternative embodiment, the insulations 20 of the two DC charging lines 18 form a boundary of the two fluid lines 30. The DC charging lines 18 and the fluid lines 30 are therefore arranged together within the insulation 20, and the fluid can flow around the DC charging lines 18.

Figure 5:
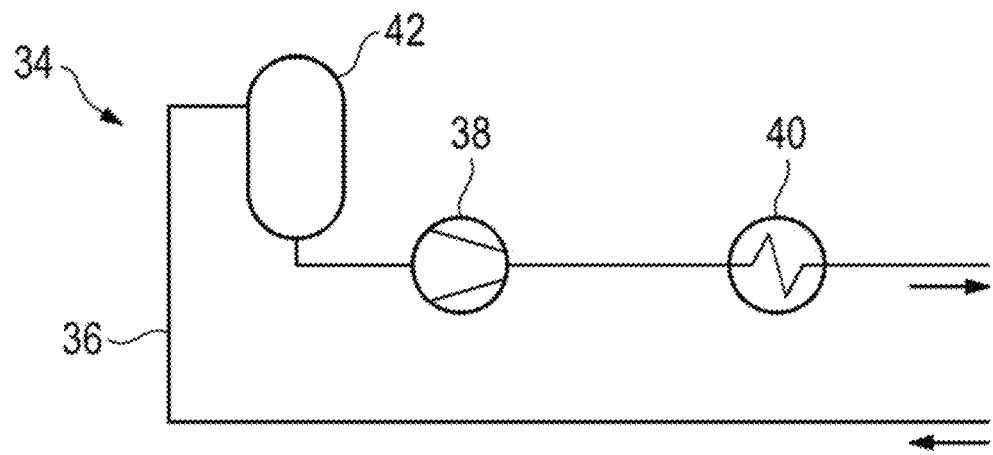
FIG. 5 shows a schematic illustration of a temperature control device of the fast charging station from FIG. 1 according to a fifth embodiment in a basic view.

The fast charging station 10 also comprises a temperature control device 34. A temperature control device 34 according to a fifth embodiment is illustrated in FIG. 5.

The temperature control device 34 comprises a line section 36 which is connected to the fluid lines 30 of the charging cable 12 in order to form a closed fluid circuit.

The temperature control device 34 also comprises a pump 38 which is arranged in the line section 36 in order to circulate the fluid in the fluid circuit. Moreover, the temperature control device 34 comprises a controllable heating device 40 in order to heat the fluid. Furthermore, the temperature control device 34 comprises an optional compensation container 42 in order to compensate, for example, for fluctuations in the volume of the fluid owing to a change in the temperature. Moreover, a loss of fluid can be compensated, and air pockets in the fluid can be reduced.

Figure 6:
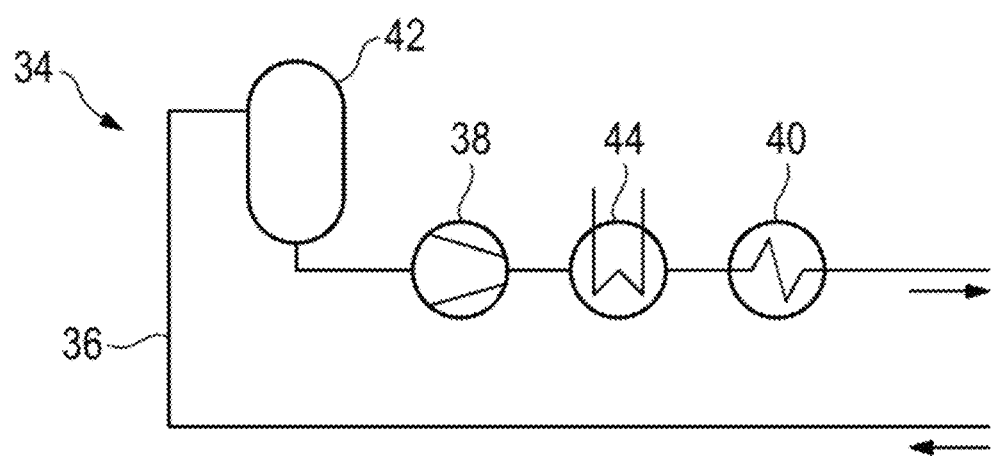
FIG. 6 shows a schematic illustration of a temperature control device of the fast charging station from FIG. 1 according to a sixth embodiment in a basic view.

Alternatively, the fast charging station 10 comprises a temperature control device 34 according to a sixth embodiment which is illustrated in FIG. 6. The temperature control device 34 according to the sixth embodiment corresponds largely to the temperature control device 34 according to the fifth element, for which reason only differences from the temperature control device 34 according to the fifth embodiment are described below.

The temperature control device 34 according to the sixth embodiment comprises a heat exchanger 44 in addition to the temperature control device 34 according to the fifth embodiment. The heat exchanger 44 can extract heat from the fluid. As a result, the food cannot only be heated by the heating device 40 but also cooled by the heat exchanger 44.

Figure 8:
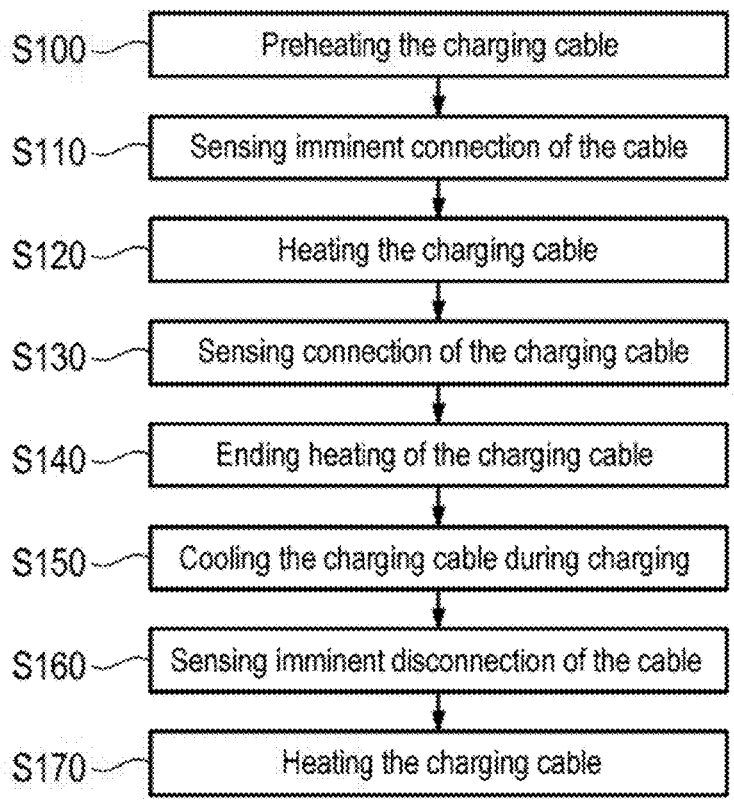
FIG. 8 shows a flowchart of method for controlling the temperature of a charging cable of the fast charging station from FIG. 1 according to a seventh embodiment.

The described fast charging station 10 according to the first involvement is designed to carry out a method for controlling the temperature of the charging cable 12 for fast charging the battery of the vehicle. The method is described below with reference to FIG. 8.

The method starts with step S100 in which the charging cable 12 is pre-heated. The charging cable 12 is pre-heated here to a temperature which ensures that the charging cable 12 can be heated in good time for subsequent connection to a vehicle to be charged, in order to reduce the rigidity to a desired extent. For this purpose, when not in use the charging cable 12 is pre-heated continuously with a low constant power level. The pre-heating is carried out as a function of the temperature, i.e. as a function of an ambient temperature and a temperature of the charging cable 12.

In step S110 imminent connection of the charging cable 12 to the vehicle is sensed. The imminent connection of the charging cable 12 to the vehicle is sensed here, for example, by interaction of the driver with the fast charging station 10, for example by identification or authentication of the driver at the fast charging station. For this purpose, a payment card or identification card, for example a credit card, is connected to the fast charging station 10 by insertion. In this context, a first activation of a user interface of the fast charging station 10 is already sensed as imminent connection of the charging cable 12 to the vehicle.

Figure 7:
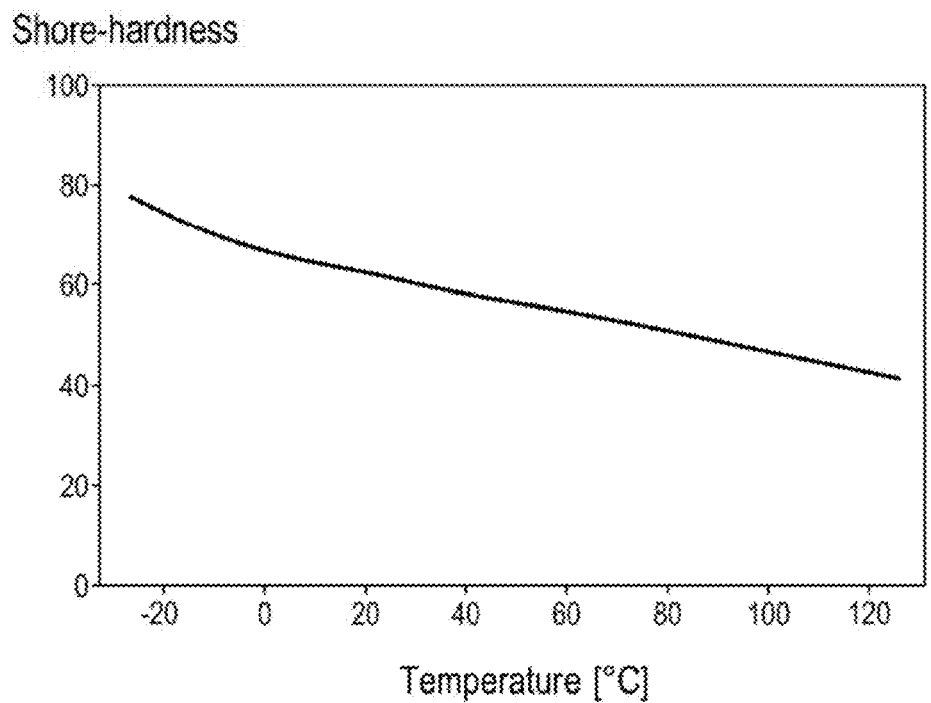
FIG. 7 shows an exemplary diagram of a profile of a Shore hardness plotted against the temperature.

In step S120 heating of the charging cable 12 is carried out in order to form an electrical connection of the charging cable 12 to the vehicle. The charging cable 12 is therefore heated in order to reduce its hardness and make the charging cable 12 more easily bendable. A corresponding diagram of the Shore hardness plotted against the temperature is shown in FIG. 7 for a plastic which is often used. In this context, when the charging cable 12 is heated to approximately 40° C. a reduction of the Shore hardness of 10° Shore to 15° Shore is already achieved compared with a temperature of 0° C. As a result of the sensing of the imminent connection of the charging cable 12 to the vehicle, the heating 12 can already be started before the charging plug 14 of the charging cable 12 is removed from its holder 16.

In step S130 connection of the charging cable 12 to the vehicle is sensed. For this purpose, the charging cable 12 is connected via its charging plug 14 to a corresponding charging socket (not illustrated in the figures) of the vehicle. An electrical communication signal between the charging station 10 and the vehicle is evaluated in order to detect the connection, said signal being transmitted via the charging cable 12. In the present exemplary embodiment for charging according to the charging standard IEC 61851 this is the control pilot signal or the proximity pilot signal.

In step S140 the heating of the charging cable 12 is subsequently ended.

After the connection of the charging cable 12 to the vehicle, in step S150 the charging cable 12 is cooled in order to conduct away waste heat which occurs during the fast charging and keep the line resistance of the DC charging lines 18 low.

After the end of the charging process, monitoring takes place in order to sense, in step S160, imminent disconnection of the charging cable 12 from the vehicle. For this purpose, the method firstly waits for the end of the charging process. In this exemplary embodiment, after the end of the charging process, a notification in the form of a digital message, for example an SMS, a message within a special app or another message is sent to the driver of the vehicle by the fast charging station 10. The driver sends a corresponding confirmation in the same way to the fast charging station 10, which is sensed as a signal for the imminent disconnection of the charging cable from the vehicle. Alternatively, approaching of the driver to the vehicle or to the charging station can be detected and used as a signal for the imminent disconnection of the charging cable from the vehicle. Imminent disconnection of the charging cable 12 from the vehicle can also be sensed through interaction of the driver with the fast charging station.

Subsequently, in step S170, the charging cable 12 is heated again so that the charging cable 12 can easily be disconnected from the vehicle. After the disconnection of the charging cable 12 from the vehicle, the heating of the charging cable is ended. The disconnection is correspondingly sensed, as described above, by means of a communication signal between the vehicle and the fast charging station. Alternatively, the disconnection is sensed by the charging plug 14 of the charging cable 12 being plugged into its holder 16 again.

What is claimed is:

1. A method for controlling a temperature of a charging cable of a fast charging station for fast charging a battery of a vehicle with an electric drive, comprising the steps of:
    heating a length of the charging cable by activating a heating device that extends along the length of the charging cable, which consequently reduces a rigidity of the length of the charging cable to a pre-determined extent, in preparation for an electrical connection between the charging cable and the vehicle,
    sensing the electrical connection between the charging cable and the vehicle, and
    upon sensing the electrical connection, ending the heating of the charging cable for fast charging the battery of the vehicle.

2. The method as claimed in claim 1, further comprising pre-heating the charging cable.

3. The method as claimed in claim 1, further comprising sensing imminent connection of the charging cable to the vehicle, and
   wherein the step of heating the charging cable in order to form an electrical connection with the vehicle takes place after the sensing of imminent connection of the charging cable to the vehicle.

4. The method as claimed in claim 3, wherein the step of sensing imminent connection of the charging cable to the vehicle comprises sensing an approaching of the vehicle to the fast charging station.

5. The method as claimed in claim 1, wherein the step of sensing connection between the charging cable and the vehicle comprises evaluating an electrical signal between the charging station and the vehicle via the charging cable.

6. The method as claimed in claim 1, wherein the step of sensing connection between the charging cable and the vehicle comprises sensing an expiry of a connection timer.

7. The method as claimed in claim 1, wherein the method further comprises
   sensing imminent disconnection between the charging cable and the vehicle, and
   heating the charging cable to bring about disconnection of the charging cable from the vehicle.

8. The method as claimed in claim 7, wherein the step of sensing imminent disconnection between the charging cable and the vehicle comprises sensing an end of the charging process.

9. The method as claimed in claim 1, wherein the step of sensing imminent disconnection between the charging cable and the vehicle comprises sensing a signal or sensing an activation by a driver of the vehicle.

10. A fast charging station comprising a charging cable for fast charging a battery of a vehicle with an electric drive, wherein the fast charging station is configured for controlling a temperature of a charging cable by
   (i) heating a length of the charging cable by activating a heating device that extends along the length of the charging cable, which consequently reduces a rigidity of the length of the charging cable to a pre-determined extent, in preparation for an electrical connection between the charging cable and the vehicle,
   (ii) sensing the electrical connection between the charging cable and the vehicle, and
   (iii) upon sensing the electrical connection, ending the heating of the charging cable for fast charging the battery of the vehicle.

11. The method of claim 1, wherein the heating device is a heating element that is connected to a conductor that extends along the length of the charging cable.

12. The method of claim 1, wherein the heating device is a coolant circuit that extends along the length of the charging cable.

13. The method of claim 1, wherein the heating device is either (i) a heating element that is connected to a conductor that extends along the length of the charging cable, or (ii) a coolant circuit that extends along the length of the charging cable.

14. The fast charging station of claim 10, wherein the heating device is a heating element that is connected to a conductor that extends along the length of the charging cable.

15. The fast charging station of claim 10, wherein the heating device is a coolant circuit that extends along the length of the charging cable.

16. The fast charging station of claim 10, wherein the heating device is either (i) a heating element that is connected to a conductor that extends along the length of the charging cable, or (ii) a coolant circuit that extends along the length of the charging cable.

* * * * *